(12) United States Patent
Garcia Martin et al.

(10) Patent No.: US 11,822,299 B2
(45) Date of Patent: Nov. 21, 2023

(54) BUILDING MANAGEMENT CONTROL

(71) Applicant: Telefonaktiebolaget LM Ericsson (publ), Stockholm (SE)

(72) Inventors: Miguel Angel Garcia Martin, Madrid (ES); Veronica Sanchez Vega, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/541,104

(22) PCT Filed: Jan. 26, 2015

(86) PCT No.: PCT/EP2015/051498
§ 371 (c)(1),
(2) Date: Jun. 30, 2017

(87) PCT Pub. No.: WO2016/119816
PCT Pub. Date: Aug. 4, 2016

(65) Prior Publication Data
US 2017/0343971 A1 Nov. 30, 2017

(51) Int. Cl.
*G05B 15/02* (2006.01)
*H04W 4/02* (2018.01)
(Continued)

(52) U.S. Cl.
CPC ........... *G05B 15/02* (2013.01); *G06F 21/305* (2013.01); *H04L 12/2829* (2013.01);
(Continued)

(58) Field of Classification Search
CPC ........... G05B 15/02; G05B 2219/2642; G05B 19/418; G06F 21/305; G06F 2221/2111;
(Continued)

(56) References Cited

U.S. PATENT DOCUMENTS 6,114,991 A * 9/2000 Richton ................ G01S 5/0063
342/357.42
6,400,956 B1 * 6/2002 Richton ................ H04W 4/02
340/988
(Continued)

FOREIGN PATENT DOCUMENTS

CN  102947765 A  2/2013
CN  103001840 A  3/2013
(Continued)

OTHER PUBLICATIONS

PCT International Search Report for International application No. PCT/EP2015/051498—dated Oct. 8, 2015.
(Continued)

*Primary Examiner* — Darrin D Dunn
(74) *Attorney, Agent, or Firm* — BAKER BOTTS L.L.P.

(57) ABSTRACT

A device manager (200; 300; 400) and associated method for controlling one or more devices (203a-c; 403a-c). The device manager comprises a receiver (304) configured to receive sensor data from one or more sensors (202a-d; 402a-d). The device manager comprises a device controller (314) configured to determine device control data for controlling the operation of one or more devices based on the received sensor data and one or more policy rules stored in a memory (306). The device manager comprises a transmitter (302) configured to transmit the device control data to the one or more devices. The receiver is further configured to receive, from a network node (212, 214; 412) of a telecommunications network, user equipment, UE, data relating to one or more UEs (426a-c) associated with the one or more devices. The device controller is further configured to determine the device control data based on the received UE data.

28 Claims, 6 Drawing Sheets

(51) Int. Cl.
  *H04L 67/125* (2022.01)
  *G06F 21/30* (2013.01)
  *H04L 12/28* (2006.01)
  *H04W 4/50* (2018.01)
  *H04L 67/12* (2022.01)
  *H04L 67/50* (2022.01)

(52) U.S. Cl.
  CPC ........... *H04L 67/125* (2013.01); *H04W 4/023* (2013.01); *G05B 2219/2642* (2013.01); *G06F 2221/2111* (2013.01); *H04L 67/12* (2013.01); *H04L 67/535* (2022.05); *H04W 4/50* (2018.02)

(58) Field of Classification Search
  CPC ... H04L 12/2829; H04L 67/125; H04L 67/12; H04L 67/22; H04L 12/2821; H04L 12/282; H04W 4/023; H04W 4/50
  See application file for complete search history.

(56) References Cited

U.S. PATENT DOCUMENTS

| | | | | |
|---|---|---|---|---|
| 7,706,975 | B2* | 4/2010 | Farmer | H04W 64/00 701/469 |
| 8,024,073 | B2* | 9/2011 | Imes | H04L 12/2818 700/276 |
| 8,350,697 | B2* | 1/2013 | Trundle | G08C 19/16 340/539.3 |
| 8,396,604 | B2* | 3/2013 | Imes | H02J 13/00028 700/286 |
| 2011/0125329 | A1 | 5/2011 | Oswald | |
| 2011/0191475 | A1 | 8/2011 | Sudit | |
| 2012/0252430 | A1* | 10/2012 | Imes | G05B 15/02 455/418 |
| 2013/0079903 | A1 | 3/2013 | Kemmann et al. | |
| 2013/0109406 | A1* | 5/2013 | Meador | H04W 4/33 455/456.1 |
| 2015/0198938 | A1* | 7/2015 | Steele | G05B 15/02 700/275 |
| 2015/0327010 | A1* | 11/2015 | Gottschalk | H04W 4/021 455/456.1 |
| 2015/0369509 | A1* | 12/2015 | Schwarz | H04L 67/125 700/276 |
| 2016/0006576 | A1* | 1/2016 | Matsuzaki | G06F 13/00 709/224 |
| 2016/0202677 | A1* | 7/2016 | Trundle | G05B 15/02 700/275 |
| 2020/0252230 | A1* | 8/2020 | Shoemaker | H04W 4/023 |

FOREIGN PATENT DOCUMENTS

| | | |
|---|---|---|
| DE | 10 2013 002 430 A1 | 8/2014 |
| WO | 2014047501 A1 | 3/2014 |

OTHER PUBLICATIONS

PCT Written Opinion of the International Searching Authority for International application No. PCT/EP2015/051498—dated Oct. 8, 2015

Office Action in corresponding/related China Application No. 201580074611.3 dated Feb. 28, 2020.

Notice of Reexamination issued for Chinese Application No. 201580074611.3—dated Mar. 24, 2023.

* cited by examiner

BUILDING MANAGEMENT CONTROL

PRIORITY

This nonprovisional application is a U.S. National Stage Filing under 35 U.S.C. § 371 of International Patent Application Serial No. PCT/EP2015/051498 filed Jan. 26, 2015, and entitled "Building Management Control."

TECHNICAL FIELD

This invention generally relates to the Building Automation Control (BAC), which may also be called Smart Homes, Home Security and Home Energy Management Systems (HEMS). More specifically, the invention is related to but is not limited to a device manager and a network entity for use in BAC.

BACKGROUND

BAC includes the centralized control of lighting, heating, ventilation, air conditioning, appliances, security locks of gates and doors and other similar systems, with the purpose of providing convenience, comfort, energy efficiency, and security. A building automation system may integrate electrical devices in (and in proximity to) a house with each other and may allow to control them based on information received from sensors and a set of policy rules.

It is noted that the methods and apparatus discussed herein refer to BAC and that term encompasses control of systems in and around any building, whether domestic or commercial.

Devices may be connected through a home network to allow control by a personal computer or other user equipment (UE), and may allow remote access from the internet. Through the integration of information technologies with the building environment, systems and appliances are enabled to communicate in an integrated manner, which results in convenience, energy efficiency, and safety benefits.

HEMS encompass any product or service that monitors, controls, or analyzes energy in the home or other building. This definition includes residential utility demand response programs, home automation services, personal energy management, data analysis and visualization, auditing, and related security services.

While there is no standardized reference architecture for these systems, most of the known systems follow similar architectural principles. FIG. 1 shows a typical architecture that supports these systems.

A central function of BAC solutions is the Device Manager 100, which may also be referred to as a Building Manager (BM) or Home Manager. The Device Manager (DM) 100 is in electrical communication with and is able to monitor a number of apparatuses 102*a-d*, which may be sensors or devices to be controlled, allowing control of temperature, air conditioner systems, window shades, etc. The Device Manager 100 can act as a policy manager capable of the control of a number of devices within a building. Users can configure simple policy rules that control temperature, lighting, window shades, air conditioning, etc., typically depending on time and day of the week.

The apparatuses 102*a-d* can have Internet Protocol (IP) connectivity by including Subscriber Identity Module (SIM) or Universal Subscriber Identity Module (USIM) capabilities and a cellular interface. Alternatively, IP connectivity can be provided by means of a Home Area Network 104 terminated by a Building Controller 106. The apparatuses 102*c-d* may be battery operated, in which case, connectivity may be provided by the Home Area Network 104 configured to connect the apparatuses 102*c-d* to the Building Controller 106. The Building Controller 106 acts as a gateway between the low-powered apparatuses 102*c-d* and the Device Manager 100. There could be more than one Building Controller 106 depending on the Home Area Network 104 setup and apparatus 102*a-d* types.

The Device Manager 100 function can be implemented as an application server node in the Internet or the Service Provider domain of a telecommunications network. In other systems, the Device Manager 100 may be implemented as a separate consumer equipment located in the home network. Alternatively, the Device Manager 100 can be collocated with the Building Controller 106 in the home network. The Device Manager 100 interfaces with the Building Controller 106 for receiving status information from low-powered apparatuses 102*c-b* and applying control to them. There might be apparatuses 102*a-b* that are managed from the Device Manager 100 without intervention of the Building Controller 106.

The user can operate the Device Manager 100 through a dash board 108, which may be a graphical user interface (GUI). Some systems may also provide the user with access to the Device Manager 100 through an application or web interface, in which case the Device Manager 100 is either connected to a fixed network (such as the Internet) through a Customer Premises Equipment (CPE) 110 or implements a cellular access (e.g., GSM, WCDMA, etc.). The user can also retrieve service data and statistics from the Device Manager 100 through the dash board 108.

Typically the Device Manager 100 authenticates the user, especially if the user is accessing from a public Internet interface, and then allows the user to configure policy rules for home control within the Device Manager 100. The user can also control some devices, for example, the user could close the shades of the home in order to decrease the temperature.

Initial BAC solutions were quite rudimentary. For example, a thermostat that controls the periods of time at which the house is heated is used in early systems as a first rudimentary control element for defining policy rules for a heating system. The policy rules are manually dictated by the user when setting the temperature of comfort. However, such a system allows only a single policy rule in place: the current temperature.

Those initial control elements have evolved into more sophisticated ones. For example, the thermostat has evolved into a more sophisticated control where different temperatures can be set depending on the day of the week and the time of day, and the user can select different temperatures, i.e. policy rules, for different periods of time.

In known BAC systems, it is also common to see centralized controls installed in a building, for example, alarm or automation centers. These are able to read different signals from sensors in the building, from infrared sensors, magnetic switches (for door and window opening detection), temperature and humidity sensors, etc. The control system is able to take the appropriate actions according to well defined policy rules. In general, the user has a bit of control over the policy rules that control a few aspects of a building, mostly reduced to activating the periods of absence from the home (alarm activation), and setting the time and temperature of the building for comfort when it is more likely for the building to be occupied.

The combination of limited control of parameters from the user, limited availability of sources of information (sensors and the like) connected to BAC systems, and unfriendly user interfaces has led users to use static policy rules that do not often change. For example, most of the HEMS provide a central hub for monitoring energy consumption, a device that inserts in the plug of appliances for reading consumption and switches the appliance on/off, and a central dashboard that allows the user to manage their energy usage. The management is mostly manual, although some known HEMS provide interfaces for external control. For example, the HEMS may regulate the temperature in a building based on sensors located in that building. For example, the HEMS may monitor whether a television is on or off and control heating accordingly based on a set of policy rules.

Due to this technological landscape, in many HEMS, once a user has set, for example, the periods of time of operation and temperature of comfort for a heating system, they are rarely changed, even when no one is in the house during the comfort temperature period. The contrary is also true in that when someone is at home during a period of time of low temperature (e.g. when the heating system is turned off), the temperature remains low due to the static policy rule. In other systems, there is limited temperature control based on the available sensors in the home.

The immediate consequence is that the policy rules that govern HEMS do not really consider potential changes in the habits of the users of the building and, as a consequence, energy can be wasted due to inefficiencies. Energy could be saved with smarter systems.

There are scenarios where the temperature of a building is programmed in a policy rule to be kept to a comfort level, but the building is empty. Some known Device Managers will do nothing in such situations, so the building is warmed when no one is inside. Some other Device Managers will read inputs from, e.g., a television, use that input to determine whether a user is present in the building and control the temperature of the building accordingly in spite of a policy rule for keeping the temperature at a pre-set comfort level. However, this creates additional side effects, such as, when the user eventually arrives home, the house is cold. Furthermore, if the TV is used as a presence sensor, if the user arrives home and does not switch the TV on, the house will remain cold.

Another problem with known systems occurs when the policy rule determines that the temperature of the building should be kept to a low level due to the start of the night time period when users are typically asleep. If a user is still active in the building at a time later than the start of the night time period, the temperature of the building will decrease even when the temperature should be kept to a comfort level until that user stops being active.

SUMMARY

It is an aim of this invention to mitigate or solve one or more problems in the prior art including those mentioned above. A further aim of the invention is to provide an accurate and efficient method for BAC and/or HEMS.

According to the invention in one aspect, there is provided a device manager for controlling one or more devices. The device manager comprises a receiving means, which may be a receiver, configured to receive sensor data from one or more sensors. The device manager comprises a device controlling means, which may be a device controller, configured to determine device control data for controlling the operation of one or more devices based on the received sensor data and one or more policy rules stored in a memory. The device manager comprises a transmitting means, which may be a transmitter configured to transmit the device control data to the one or more devices. The receiver is further configured to receive, from a network node of a telecommunications network, user equipment, UE, data relating to one or more UEs associated with the one or more devices. The device controller is further configured to determine the device control data based on the received UE data.

Optionally, the UE data comprises UE location data.

Optionally, the device controller is configured to determine the device control data based on the UE location data and a location of at least one of the one or more devices.

Optionally, the device manager further comprises a UE locating means, which may be a UE locator configured to determine whether at least one of the one or more UEs is located within a proximity of a location of the one or more devices, based on the received UE location data.

Optionally, the device controller is configured to determine the device control data for at least one of the one or more devices when at least one of the UEs is located in the proximity of the location of at least one of the one or more devices, and/or when at least one of the UEs is not located within the proximity of at least one of the one or more devices.

Optionally, the UE locator configured to determine a trajectory for at least one of the one or more UEs based on a plurality of successive UE location data for the at least one UE.

Optionally, if the determined trajectory indicates that the at least one UE is travelling towards the location of at least one of the one or more devices, the device controller is configured to determine the device control data based on the determined trajectory, the received sensor data and the one or more policy rules stored in the memory.

Optionally, the UE locator is configured to estimate a time of arrival of the at least one UE to a proximity of a location of at least one of the one or more devices, and wherein the device controller is configured to determine the device control data based on the estimated time of arrival.

Optionally, the device manager further comprises an equipment module configured to associate the one or more UEs with the one or more devices.

Optionally, the device controller is configured to determine the device control data for controlling the operation of one or more of: a heating system; an air conditioning system; automated window coverings; one or more home or garden appliances; and electric car charging.

Optionally, the telecommunication network node is at least one of: a Policy and Charging Rules Function, PCRF, entity; a Mobility Management Entity, MME; a Traffic Detection Function, TDF, entity; and a Policy and Charging Enforcement Function, PCEF, entity.

Optionally, the device controller is configured to transmit, via the transmitter, a request to the telecommunication network node to subscribe to UE data therefrom.

Optionally, the device manager further comprises a sensor controlling means, which may be a sensor controller, configured to transmit a request, via the transmitter, to the one or more sensors for further sensor data following receipt of the UE data, and wherein the device controller is further configured to determine the device control data based on the further sensor data.

Optionally, the UE data comprises UE activity data, and wherein the device controller is further configured to determine the device control data for at least one of the one or more devices based on the received UE activity data and the received UE location data.

Optionally, the device manager further comprises a UE activity determining means, which may be a UE activity determiner, configured to determine whether at least one of the one or more UEs is active based on the received UE activity data.

Optionally, the device controller is configured to determine the device control data for at least one of the one or more devices when the at least one UE is active and the at least one UE is located within the proximity of at least one of the one or more devices, and/or when at least one of the one or more UE is not active and the at least one UE is located within the proximity of at least one of the one or more devices.

According to the invention in another aspect, there is provided a building manager configured to control one or more devices associated with a building and comprising a device manager as described above.

According to the invention in another aspect, there is provided a method for controlling one or more devices. The method comprises receiving, at a receiver, sensor data from one or more sensors. The method comprises receiving, by the receiver from a network node of a telecommunications network, user equipment, UE, data relating to one or more UEs associated with the one or more devices. The method comprises determining, at a device controller, device control data for controlling the operation of the one or more devices based on the received sensor data, one or more policy rules stored in a memory and the received UE data. The method comprises transmitting, by a transmitter, the device control data to the one or more devices.

Optionally, the UE data comprises UE location data.

Optionally, the device control data is determined based on the UE location data and a location of at least one of the one or more devices.

Optionally, the method comprises determining, by a UE locator, whether at least one of the one or more UEs is located within a proximity of a location of the one or more devices, based on the received UE location data.

Optionally, the method comprises determining, by the device controller, the device control data for at least one of the one or more devices when at least one of the UEs is located in the proximity of the location of at least one of the one or more devices, and/or when at least one of the UEs is not located within the proximity of at least one of the one or more devices.

Optionally, the method comprises determining, by a UE locator, a trajectory for at least one of the one or more UEs based on a plurality of successive UE location data for the at least one UE.

Optionally, if the determined trajectory indicates that the at least one UE is travelling towards the location of at least one of the one or more devices, the method comprises determining, by the device controller, the device control data based on the determined trajectory, the received sensor data and the one or more policy rules.

Optionally, the method comprises estimating, by the UE locator, a time of arrival of the at least one UE to a proximity of a location of at least one of the one or more devices, and determining, by the device controller, the device control data based on the estimated time of arrival.

Optionally, the method comprises associating, by an equipment module, the one or more UEs with the one or more devices.

Optionally, the method comprises the device controller determining the device control data for controlling the operation of one or more of: a heating system; an air conditioning system; automated window coverings; one or more home or garden appliances; and electric car charging.

Optionally, the telecommunication network node is at least one of: a Policy and Charging Rules Function, PCRF, entity; a Mobility Management Entity, MME; a Traffic Detection Function, TDF, entity; and a Policy and Charging Enforcement Function, PCEF, entity.

Optionally, the method comprises the device controller transmitting, via the transmitter, a request to the telecommunication network node to subscribe to UE data therefrom.

Optionally, the method comprises transmitting, by a sensor controller via the transmitter, a request to the one or more sensors for further sensor data following receipt of the UE data, and determining, by the device controller, the device control data based on the further sensor data.

Optionally, the UE data comprises UE activity data, and wherein the method comprises determining, by the device controller, the device control data for at least one of the one or more devices based on the received UE activity data and the received UE location data.

Optionally, the method comprises determining, by a UE activity determiner, whether at least one of the one or more UEs is active based on the received UE activity data.

Optionally, the device controller determines the device control data for at least one of the one or more devices when the at least one UE is active and the at least one UE is located within the proximity of at least one of the one or more devices, and/or when at least one of the one or more UE is not active and the at least one UE is located within the proximity of at least one of the one or more devices.

According to the invention in another aspect, there is provided a method for controlling one or more devices associated with a building comprising the method as described above.

According to the invention in another aspect, there is provided a computer program comprising instructions which, when executed on at least one processor, cause the at least one processor to carry out the method as described above.

According to the invention in another aspect, there is provided a carrier containing the computer program described above, wherein the carrier is one of an electronic signal, optical signal, radio signal, or non-transitory computer readable storage medium.

BRIEF DESCRIPTION OF DRAWINGS

Exemplary embodiments of the invention are disclosed herein with reference to the accompanying drawings, in which.

DETAILED DESCRIPTION

Figure 1:
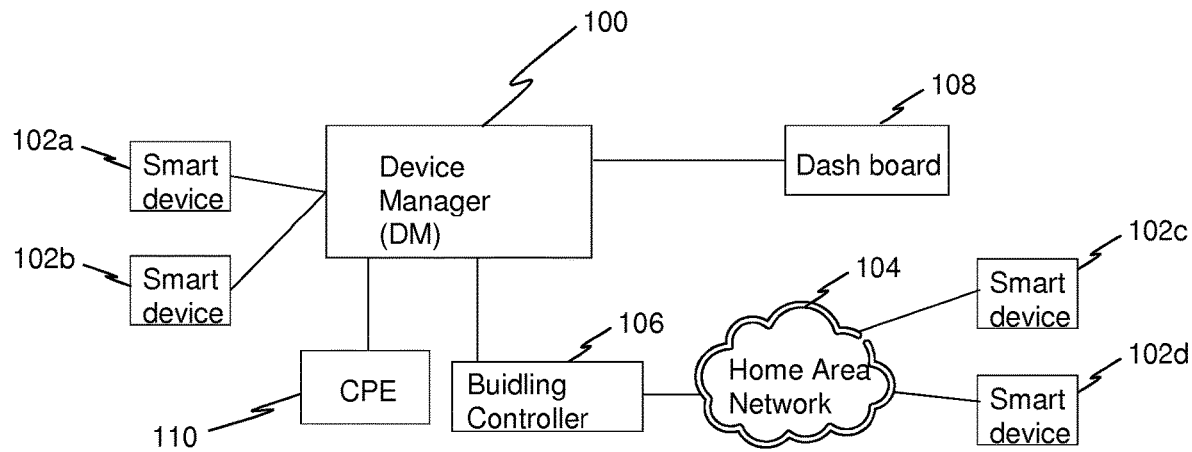
FIG. 1 is a block schematic diagram showing an architecture of a BAC system.

Generally, disclosed herein are methods and apparatus that extend the concept of a Device Manager) with the implementation of a new interface towards a network node (e.g. one or both of a Policy and Charging Rules Function (PCRF) entity or a Mobility Management Entity (MME)) in a telecommunication operator's network as described below.

Since a new interface towards the network node is defined, this allows for two implementations of the Device Manager. In a first implementation, the Device Manager is small-scale and may be implemented in a device controlling a single home, similar to current Device Managers. In a further implementation, the Device Manager may be large-scale and may be implemented in a server installed in the telecommunication network of the operator and configured to control a plurality (e.g. in the order of hundreds or thousands) of buildings. In some cases a large-scale Device Manager can be tightly integrated with, or be part of, a PCRF entity of a Packet Core Network of the telecommunications operator.

In exemplary methods and apparatus, a Device Manager may receive inputs from a plurality of sources. Some of these sources may be sensors located internally in a house (or other building) to be managed. Those internal sources may include personal infrared sensors, surveillance cameras and computers and other devices configured to transmit activity data to the Device Manager. Other sources need not necessarily be located in the building to be controlled, such as tablets, mobile phones or other UEs.

In exemplary methods and apparatus, UE activity and/or location data, such as mobile phone location and/or activity data, may be obtained by the Device Manager to for providing more accurate BAC. Such UE-related network information may be received from a network node, such as a PCRF entity or MME, of the telecommunications operator's network.

The Device Manager may be further configured to link apparatuses (such as sensors in the house) that can provide input to the policy rules for automated control of the house, devices (such as temperature control in the house, electricity plugs, etc.) that the Device Manager can control and one or more telecommunication network identities (such as an International Mobile Station Equipment Identity (IMEI), International Mobile Subscriber Identity (IMSI) or Mobile Station International Subscriber Directory Number (MSISDN)) that identify UEs or users (by way of subscriptions) of UEs. By providing this link between those apparatuses, sensors and the telecommunication network identities, the Device Manager can correlate location and activity data of UEs with other sensors located in the house, allowing the Device Manager to control one or more devices within the house.

The Device Manager may be loaded with a set of policy rules to control one or more devices within the house. Apart from that, the Device Manager may also be configured to receive data from the network node to modify and/or complement the existing policy rules (or even add new ones) in real time with the goal of saving energy or providing a more efficient and user friendly home control.

A graphical user interface in the format of a dash board or web interface is also provided allowing the user to add, edit, or remove policy rules.

Figure 2:
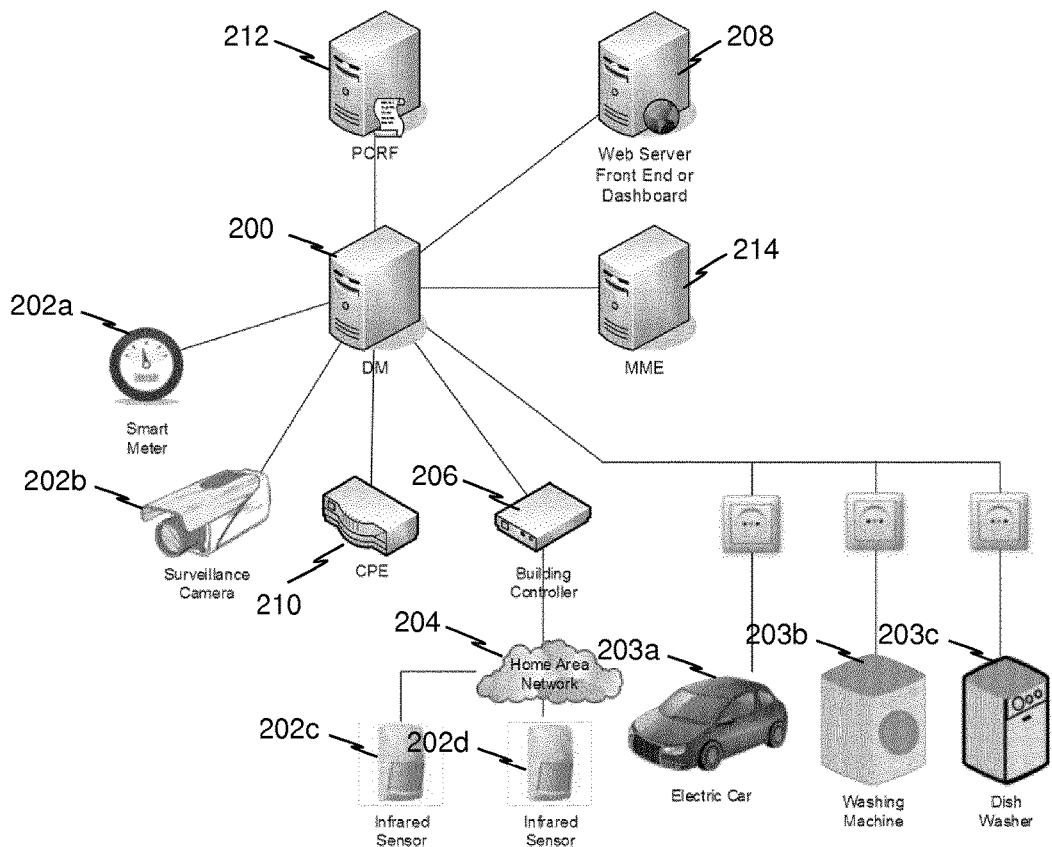
FIG. 2 is a block schematic diagram of an architecture of a BAC system.

FIG. 2 shows an architecture diagram of a BAC system. A Device Manager 200 is in electrical communication with a plurality of apparatuses (or smart devices). The apparatuses may be split into sensors 202a-d and a plurality of devices 203a-c to be controlled. In specific exemplary systems, one or more sensors may also be a device. For example, a dishwasher 203c may be able to report to the Device Manager 200 that a washing cycle has finished and then be controlled by the Device Manager 200 to power down completely rather than remain in stand-by mode. In the exemplary system of FIG. 2, the sensors comprise a smart meter 202a that can read the electricity consumption, a surveillance camera 202b that may be a baby-sitting video monitor, elderly supervision camera or the like, and infrared sensors 202c 202d although other sensors may also be used. Also in the exemplary system of FIG. 2, the devices comprise an electric car 203a, a washing machine 203b and a dishwasher 203c, although other devices such as a heating system, window shutters or blinds, an air conditioner or electricity plugs may be controlled by the system.

It is noted that the term "electrical communication", unless otherwise stated, encompasses any one of wired and wireless electrical communication, or both. Therefore, electrical communication may be, for example, a network communication over a wired connection or a network communication of over a radio frequency connection, or both.

One or more apparatuses 202a, 202b, 203a-c may be in direct electrical communication with the Device Manager 200. One or more further apparatuses 202c, 202d may be in electrical communication with the Device Manager 200 via a Home Area Network 204 and a Building Controller 206.

A web server 208 may host a graphical user interface for control of, and passing information to, the Device Manager 200. This allows the users to connect to the web server and provide parameters that configure the policy rules in the Device Manager 200. In addition, a CPE 210 may be in electrical communication with the Device Manager 200 to allow control of the Device Manager 200 and the passing of information to it from a fixed network.

The Device Manager is also in electrical communication with a network node 212, 214 of a telecommunications network. The network node may be one or both of a PCRF entity 212 and a MME 214. Accordingly, a new interface is provided between the Device Manager 200 and the PCRF entity 212 for the purpose of the Device Manager 200 receiving activity and/or location data of one or more UEs or user subscriptions associated with users that use or live in a building to be controlled by the BAC system. For example, the Device Manager 200 can subscribe to the activity and location data of the IMSIs allocated to each user associated with the building, such as a family member or employee.

In some telecommunication architectures, the PCRF entity 212 might not have accurate location and/or activity information of the UEs associated to the building to be controlled. In that case, information on UE activity and/or location may be received from an MME 214 via an interface between the Device Manager 200 and the MME 214 since the MME has accurate location and usage information.

The Device Manager 200 may use the activity and/or location information relating to a UE associated with the building to control one or more of the devices 203a-c. This may be done by modifying and/or complementing policy rules stored in the Device Manager 200.

Additionally the Device Manager 200 may implement interfaces towards a security hub that may have a number of presence sensors connected to it. The Device Manager 200 may also implement an interface towards a home gateway for acquiring an IP address in case the Device Manager 200 is implemented as a small-scale device controlling devices in a single building.

Figure 3:
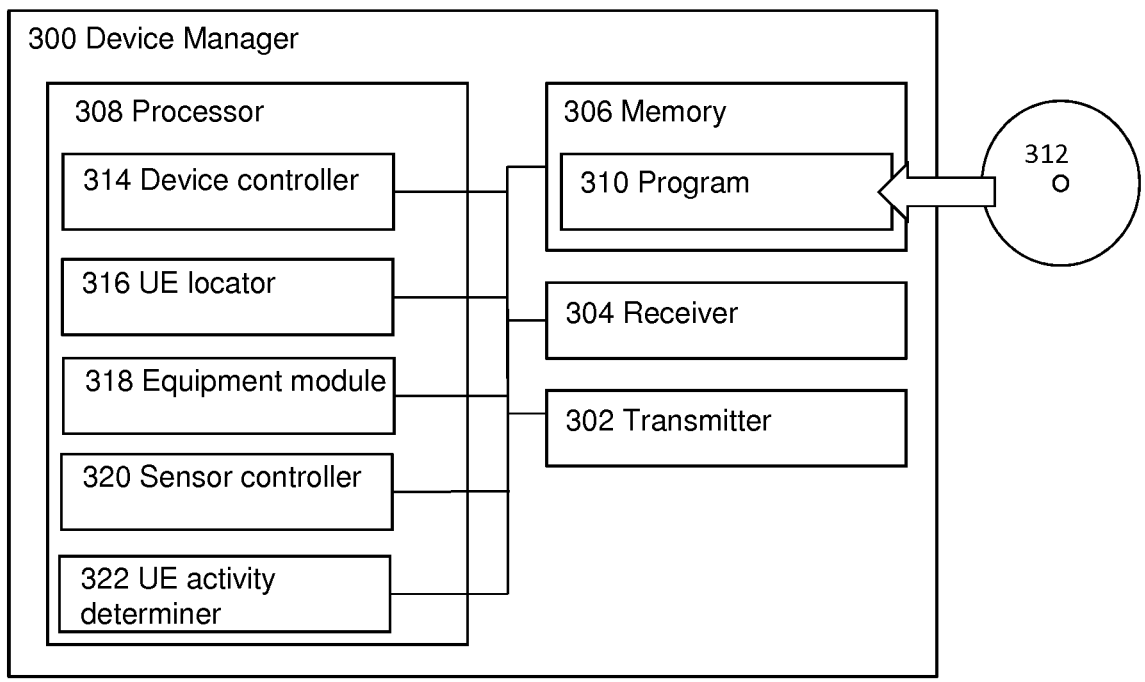
FIG. 3 is block schematic diagram of a Device Manager.

FIG. 3 shows a schematic representation of a Device Manager 300, which may be used in the system of FIG. 2. The Device Manager 300 comprises a transmitter 302 and a receiver 304. The transmitter 302 and receiver 304 are in electrical communication with apparatuses, sensors, devices, UEs, servers and/or functions in a telecommunications network and are configured to transmit and receive data accordingly.

The Device Manager 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake at least the functions of a device controller 314, a UE locator 316, an equipment module 318, a sensor controller 320 and a UE activity determiner 322, as set out below.

Each of the transmitter 302 and receiver 304, memory 306, processor 308, device controller 314, UE locator 316, equipment module 318, sensor controller 320 and UE activity determiner 322, is in electrical communication with the other features 302, 304, 306, 308, 310, 314, 316, 318, 320, 322 of the Device Manager 300. The Device Manager 300 can be implemented as a combination of computer hardware and software. In particular, the device controller 314, UE locator 316, equipment module 318, sensor controller 320 and UE activity determiner 322 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the device controller 314, UE locator 316, equipment module 318, sensor controller 320 and UE activity determiner 322, but are not limited to such.

Figure 4:
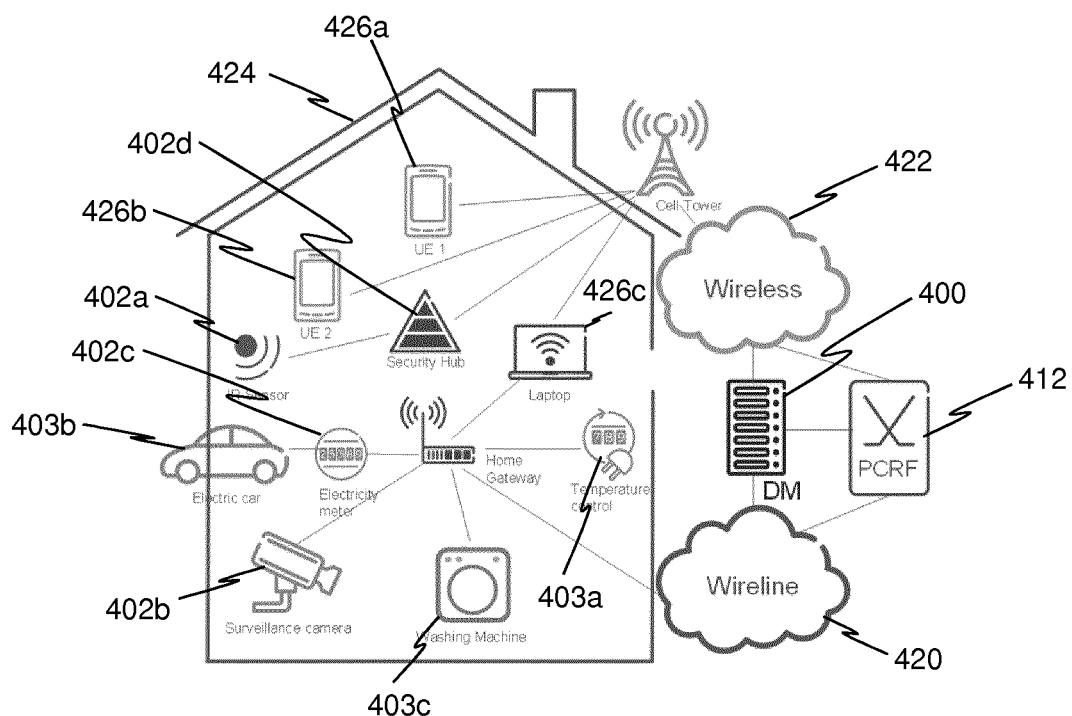
FIGS. 4-6 show an exemplary architecture of a BAC system set within a building.

FIG. 4 presents an exemplary architecture of a BAC system. The Device Manager 400 is typically located in the packet core network of an operator that provides wireline 420 and wireless 422 accesses, although it could also be located in the user's building 424. The Device Manager 400 receives input from a number of sensors 402a-d located in the building 424 such as an electricity meter, temperature sensors, surveillance cameras, and a security hub that may have infrared presence sensors and magnetic switches (to detect window/door opening) connected to it.

Additionally, the Device Manager 400 also receives input from the telecommunication network with respect to UEs (or mobile devices) 426a-c that are linked to the building 424 under control. The UEs may be associated or linked with the building by the equipment module 318 of the Device Manager 400. At any given time, the mobile devices 426a-c may or may not be located in the building 424. In the example of FIG. 4, the UEs comprise two mobile phones 426a-b (associated, for example, to the father and mother in the family) and a laptop computer 426c and all are located in the building 424. The Device Manager 400 may receive information from packet core network nodes related to the activity of the UEs (e.g. whether these devices are in use) and location information (e.g. the cell-ID or WLAN they are using), for each.

That is, the Device Manager 400 is configured to receive UE data from a telecommunication network node, and this UE data may comprise UE location data and/or UE activity data. In particular, the UE location data may correspond to or include a cell identity of a cell currently serving the UE in the telecommunication network. Also in particular, the UE activity data may indicate a type of activity, which allows the Device Manager to determine whether or not there is a human intervention behind the activity.

The Device Manager 400 can also control a number of devices, such as a temperature control 403a or switches that control the charging process of an electric car 403b, or the electricity supplied to a washing machine 403c, a dish washer or similar high-energy consumption appliance.

The Device Manager 400 provides a web interface (or GUI) that allows the user to control the Device Manager 400 in order to modify policy rules for building control and provide his own settings (e.g., temperature of comfort). This interface is not depicted in FIG. 4.

The Device Manager 400 also provides an interface to a number of network nodes (not all are depicted in FIG. 4), such as an MME (not shown) and a PCRF entity 412. This allows the Device Manager 400 to receive the UE location data of one or more UEs, detect the activity of these devices and/or or learn the bandwidth in use.

Figure 5:
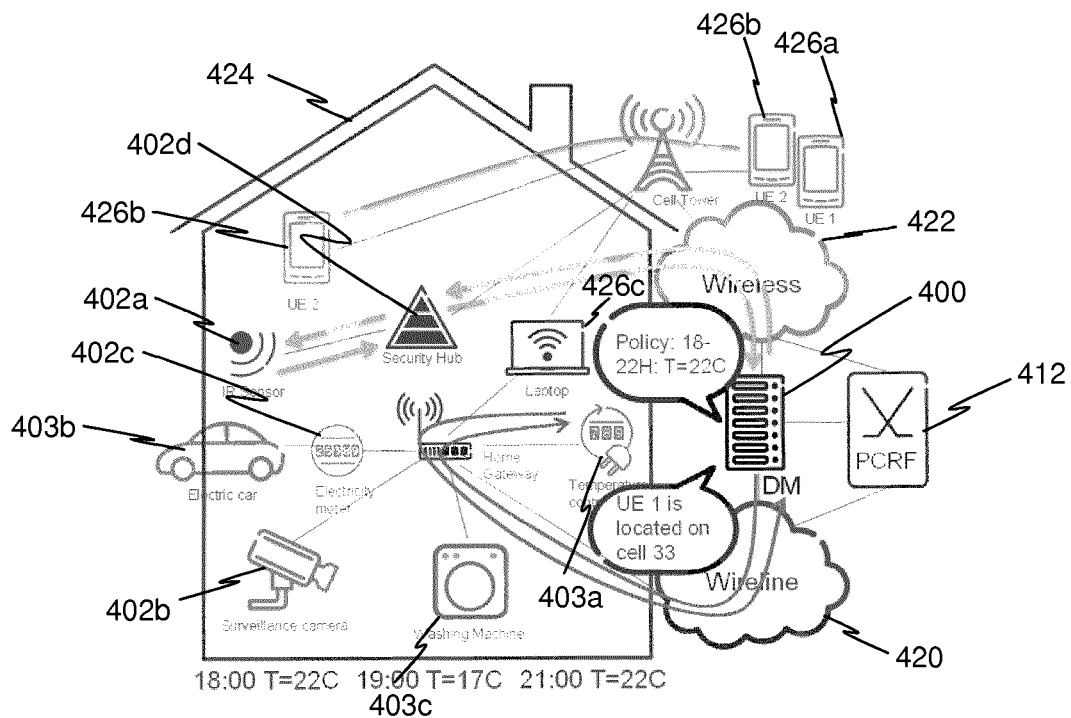

FIG. 5 shows a use case whereby the Device Manager 400 controls the temperature of the house based on inputs received from the UEs 426a-b, e.g. UE location data and/or UE activity data, on inputs received from one or more sensors and one or more policy rules. A policy rule stored in the memory 306 indicates that the temperature in the house should be at 22° C. between 18.00 and 22.00 hours. Otherwise, the temperature should be kept at 17° C. At 19.00 hours the Device Manager 400 receives activity information from UE1 426a and UE2 426b. The Device Manager 400 also receives location information indicating that both UEs 426a and 426b are in a location far away from the building 424, and thus far away from the location of the devices 403a-c to be controlled. The Device Manager 400 receives from the security hub 402d data from the IR sensor 402a in the building and no presence of a user is detected. In order to save energy, the device controller 314 of the Device Manager 400 determines and transmits device control data to the temperature control 403a to reduce the temperature to 17° C.

At 21.00 hours the Device Manager 400 receives UE data indicating a change in location of at least one of the UEs 426a and 426b, e.g. UE2 426b. The UE locator 316 of the Device Manager 400 determines a trajectory of successive UE locations and, during the following minutes, the UE locator 316 monitors the location of at least that UE2 426b and computes the trajectory that is followed by the UE2 426b. The Device Manager 400 makes a prediction of the future trajectory of the UE2 426b and concludes that the UE2 426b is located within a proximity of, and approaching, the building 424. The device controller 314 of the Device Manager 400 determines and transmits device control data to the temperature control of the building 424 to increase the temperature to 22° C. prior to the arrival of the user associated with the UE2 426b. When the user associated with the UE2 426b finally arrives at the building 424, the temperature has reached 22C. The overall effect is that the building 424 is warm when the user arrives, but the Device Manager 400 saved energy by not warming the building 424 when it was unoccupied.

Figure 6:
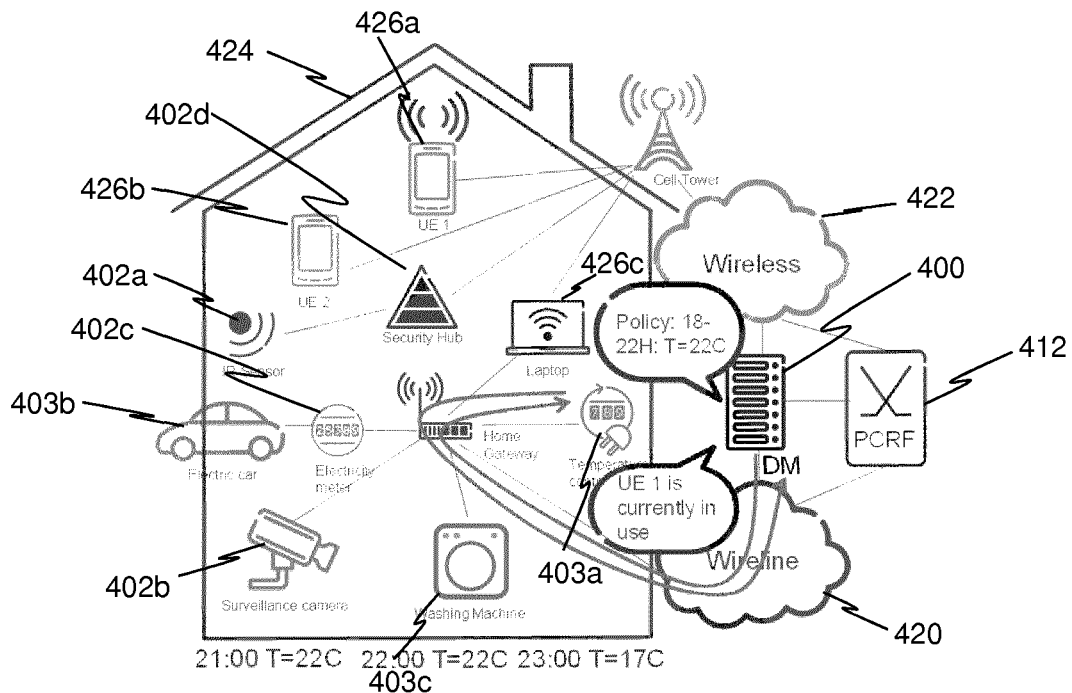

FIG. 6 shows a use case where the Device Manager 400 controls the temperature of the building 424 by receiving UE data relating to the activity of UEs 426a-b. A policy rule stored in the memory 306 of the Device Manager 400 indicates that the temperature in the building 424 should be kept at 22° C. between 18.00 and 22.00 hours. Otherwise, the temperature should be kept at 17° C. At 22.00 hours the UE locator 316 of the Device Manager 400 receives UE data indicating that UE1 426a is currently in use in a location in the building 424. According to the policy rule for building control, the device controller 314 of the Device Manager 400 should determine and transmit device control data to set the temperature to 17° C. Instead, since there is UE activity in the house, the device controller 314 does not transmit this device control data to control the temperature control 403a so the temperature remains at 22° C. Effectively, the Device Manager 400 is using the input that detects mobile device activity to impose a higher priority policy rule for temperature control to the building 424. At 23.00 hours the UE locator 316 receives UE data indicating that UE1 426a is not in use any longer. The device controller 314 resumes the previous policy rule for building control by determining and transmitting device control data to the temperature control 403a in order to decrease the temperature to 17° C. The overall effect is that the Device Manager 400 is able to keep the temperature of the building at a comfort level when the family is still awake, even at times where the family was supposed to be sleeping.

Regarding UE activity data, there may be UE activities carried out by a UE in an autonomous way and without interaction with a user, such as updating or downloading an app in the UE. This sort of activities, likely in conjunction with the time of the day, may be representative of a scenario where the UE is not active in the sense that there is no human presence behind the activity.

However, there may be other UE activities, i.e. interactive activities, which always require a user interacting with the UE, such as when the user clicks a link on a web page or a button in an app. This sort of interactive activities may be representative of a scenario where the UE is active in the sense that there is a human presence behind the interactive activity.

Figure 7:
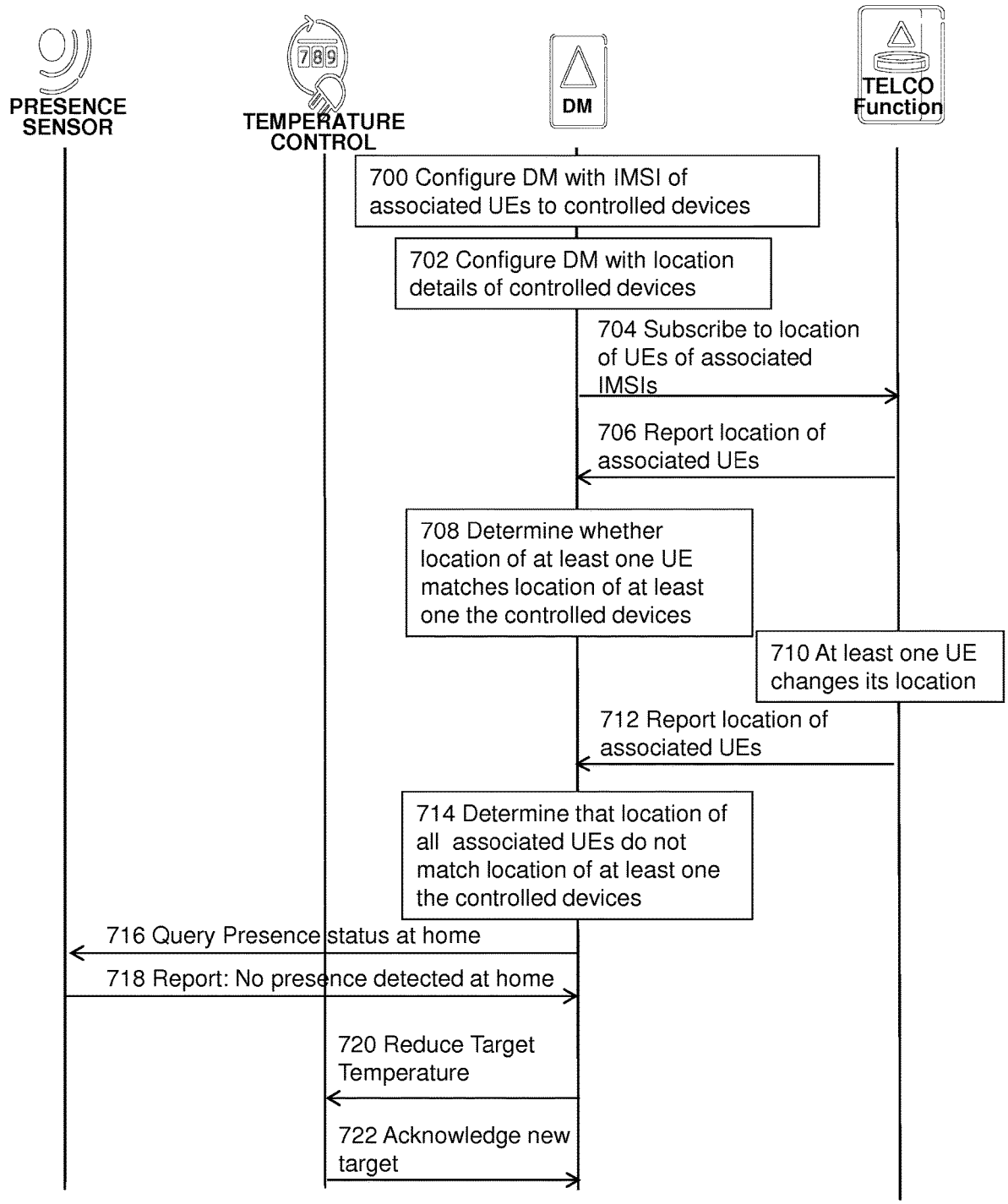
FIGS. 7-9 show signalling diagrams.
Figure 8:
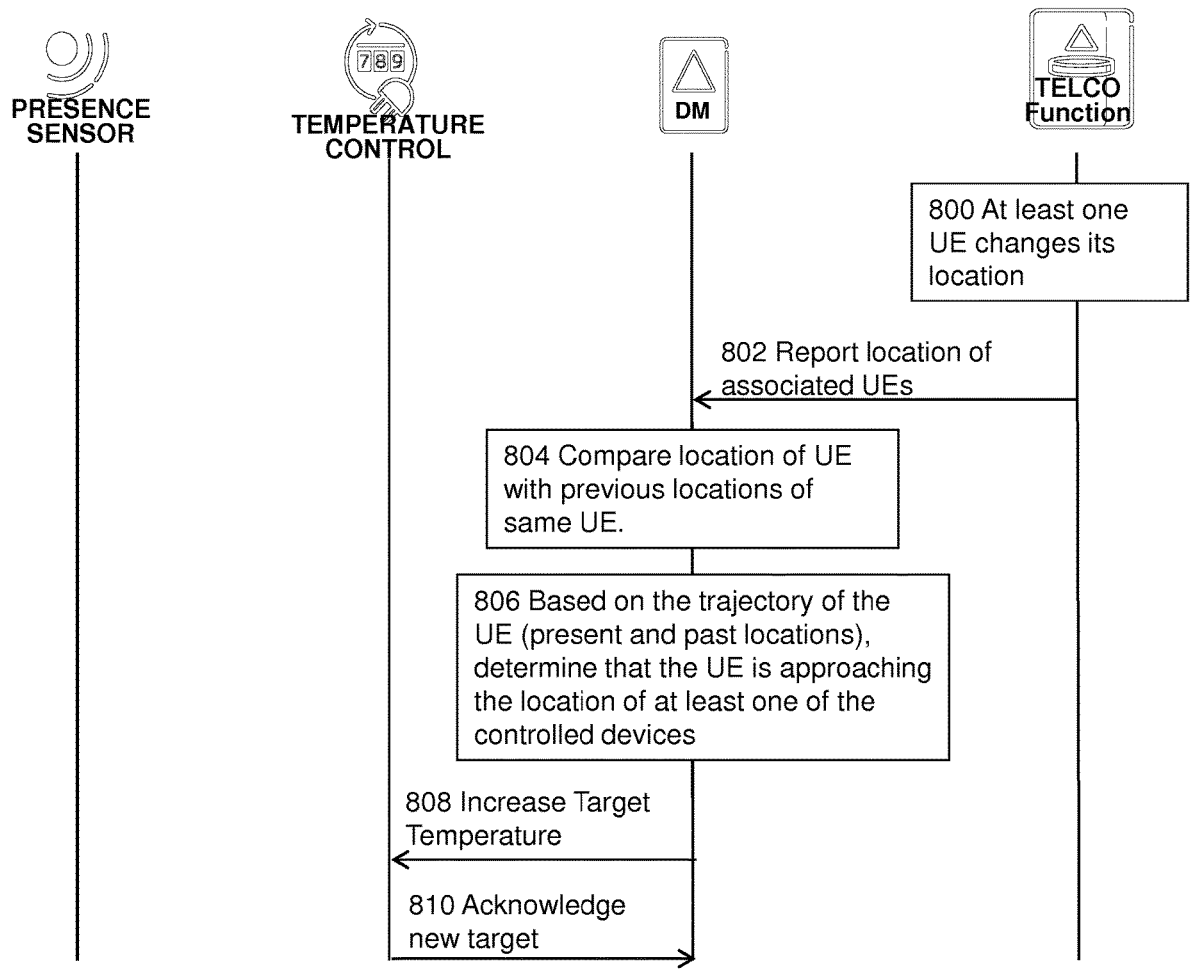
Figure 9:
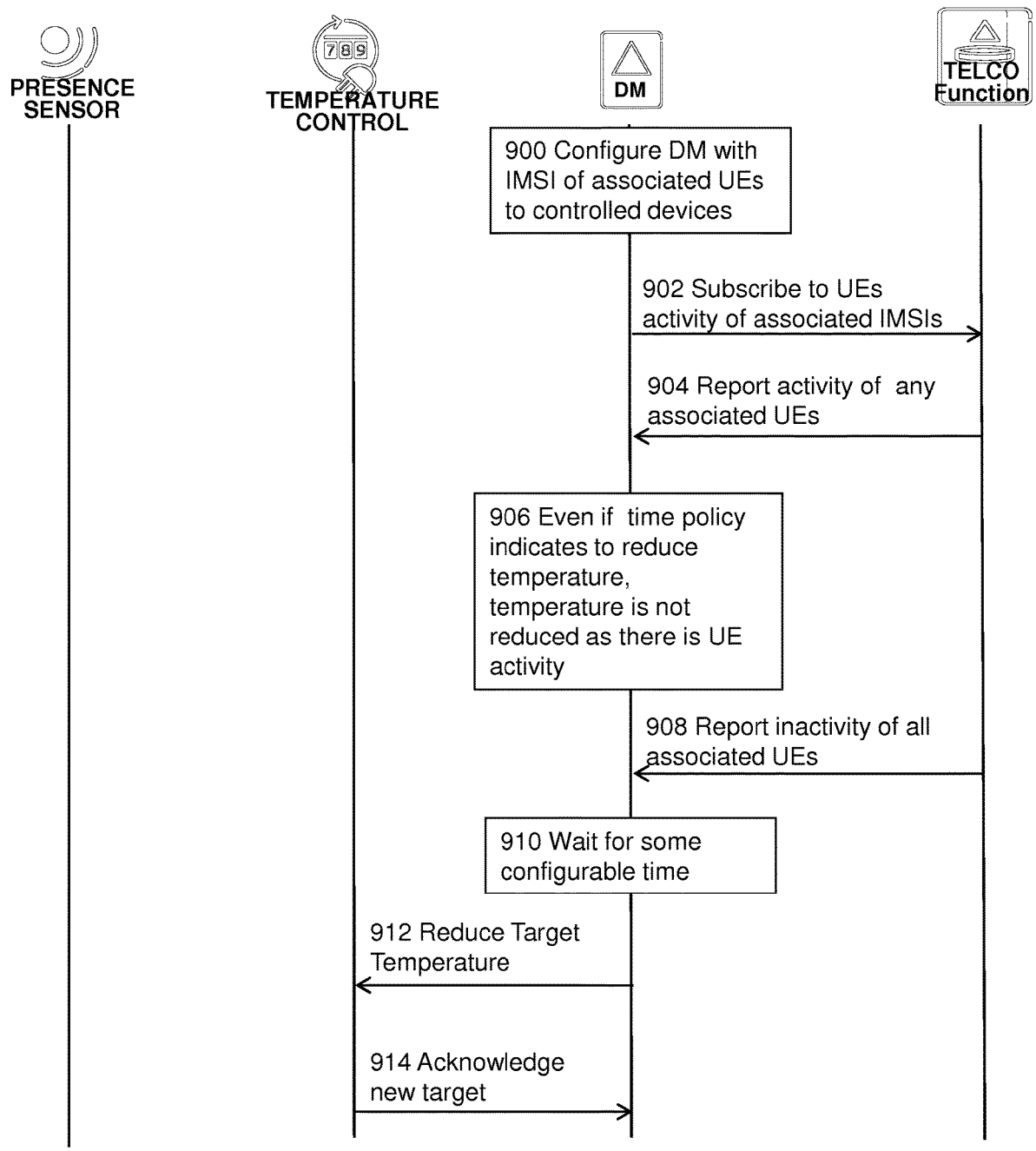

Further use cases are exemplified in FIGS. 7-9, which show signalling diagrams.

The receiver 304 of the Device Manager 400 is configured to receive sensor data from the sensors 402a-d. The device controller 314 determines device control data to control the devices 403a-c according to policy rules stored in the memory 306. The transmitter 302 is configured to transmit the device control data to the devices 403a-c. The receiver 304 may further receive UE data from the PCRF entity 412 relating to UEs 426a-c associated with the building 424 and/or with the devices 403a-c. The device controller 314 is configured to determine the device control data based on the received UE data. The UE data may comprise UE location data and/or UE activity data.

Referring to FIG. 7, the Device Manager 400 may be configured 700 to associate one or more UEs 426a-c with the building 424 or with the devices 403a-c to be controlled. This may be done by data transmitted from each UE 426a-c or by accessing the Device Manager 400 through the GUI. The equipment module 318 of the Device Manager 400 thereby associates one or more UEs with the devices 403a-c to be controlled (as well as, optionally, with sensors and with the building 424). The Device Manager 400 may be then configured 702 to store the location of the devices 403a-c, or the location of the building 424 if all the devices to be controlled can be considered in a unique location represented by the building. Again, this may be undertaken by accessing the Device Manager 400 through the GUI.

The UE locator 316 of the Device Manager 400 may then transmit 704 a message to a network node (e.g., PCRF entity 412 in FIG. 4 and MME 214 in FIG. 2) to subscribe to UE data, such as location information, for one or more of the associated UEs 426a-c. The PCRF entity 412 transmits 706 a message to the Device Manager 400 comprising the UE data, such as the UE location data, reporting the location of one or more of the UEs 426a-c. This UE location data may be expressed, for example, in terms of a cell global identity of the cell that is serving the UE, or the approximate geographical coordinates of the UE location. The UE locator 316 of the Device Manager 400 determines 708 the location of one or more of the UEs 426a-c with respect to the location of the devices 403a-c or the location of the building 424 and, in the example of FIG. 7, at least one UE is located so far in the building.

At 710, the at least one UE located in the building changes location and may have moved, for example, away from the building. The UE location data corresponding to the location change is reported 712 by the PCRF entity 412 to the Device Manager 400, which then determines 714 that the UE 426a-c is no longer located in the building 424.

The sensor controller 320 of the Device Manager 400 may then send 716 a message to one or more sensors, in the example of FIG. 7 this is the infrared (IR) sensor 402a, to request further input. The IR sensor 402a responds 718 with data indicating that there is no presence of a user sensed. The device controller 314 determines and transmits 720 device control data to the temperature control 403a to reduce the target temperature in the building. The temperature control 403a acknowledges 722 the reception and execution of the device control data.

Referring to FIG. 8, a further use case is exemplified. The steps shown in FIG. 8 may be a continuation of those in FIG. 7. The steps 700-708 may occur before the steps shown in FIG. 8.

At 800, the location of at least one UE 426a-c changes and corresponding UE location data is transmitted 802 from the PCRF entity 412 to the Device Manager 400. The UE locator 316 determines 804 the change of location of the at least one UE 426a-c, based on the new UE location data and a previous UE location data. The UE locator may thereby determine a trajectory for the at least one UE 426a-c. The UE locator 316 then determines 806, based on the determined trajectory, that the UE 426a-c is approaching or in the proximity of the building 424.

The device controller 314 determines and transmits 808 device control data to the temperature control 403a to increase the temperature in the building 424. The temperature control 403a acknowledges 810 the reception and execution of the device control data.

FIG. 9 shows a further exemplified use case based on UE 426a-c activity.

As in FIG. 7, the Device Manager 400 is configured 900 to associate one or more UEs 426a-c with the building 424 or with the devices 403a-c to be controlled. The UE activity determiner 322 transmits 902 a message to the network node (e.g., the PCRF entity 412) to subscribe to activity updates for the associated UEs 426a-c. The PCRF entity 412 transmits 904 a message with UE activity data to the Device Manager 400 indicating that there is activity of one or more UEs 426a-c associated with the building 424 or with the devices 403a-c to be controlled.

The Device Manager 400 controls 906 one or more devices 403a-c based on the UE activity data and, optionally, one or more policy rules stored in the memory 306. For example, the Device Manager 400 may increase the temperature in the building if the UE 426a-c is active, or the Device Manager 400 may not send device control data to the temperature control 403a in order to reduce the temperature. These actions may be contrary to the result of evaluating some of the stored policy rules. In this respect, the Device Manager can be modelled so that the policy rule applying when the UE activity data indicates the UE being active is other than the policy rule applying when there is no UE activity data or when the UE activity data indicates the UE being not active. Moreover, as commented above, the UE activity data allows the Device Manager to determine whether or not the UE is active by determining whether or not there is a human intervention behind the activity. In exemplary methods and apparatus, the UE activity data may be cross referenced with the UE location data for that UE 426a-c and action may be taken by the Device Manager 400 depending on whether the UE 426a-c is active or not, and located in the building 424.

After the UE 426a-c is inactive, the PCRF entity 412 reports 908 the inactivity with UE activity data to the Device Manager 400. The Device Manager 400 may then wait 910 for some configurable (e.g. via the GUI) time before sending 912 device control data to one or more devices 403a-c based on the received UE activity data indicating inactivity. For example, the device controller 314 may determine and transmit 912 device control data to the temperature control 403a to reduce a target temperature in the building 424. The temperature control 403a acknowledges 914 the reception and execution of the action according to the control data.

Exemplary methods and apparatus disclosed herein provide for determining polices for controlling devices in a building. Exemplary methods and apparatus comprise a Policy Decision Point (e.g., a Device Manager 400) provisioned with policy rules that control the activation, deactivation, and degree of operation of a plurality of devices 403a-c. In particular, the Policy Decision Point may comprise the Device Manager 400 alone, or a combination of the Device Manager 400 and the PCRF 412. The Policy Decision Point monitors the location and activity of mobile devices (UEs 426a-c) whose identifiers are linked to said plurality of devices 403a-c through an interface to a node of a telecommunication network (e.g., MME). The Policy Decision Point may add, modify or delete the policy rules for home control based on the monitored information of the mobile devices.

In exemplary methods and apparatus, there is provided a Device Manager 300 in a telecommunication network for monitoring sensors 402a-d and controlling devices 403a-c. The Device Manager comprises an equipment module 318 that may be configured to define a number of sensors 402a-d, devices 403a-c to be controlled and UEs 426a-c, and to associate them with each other; in this embodiment, the equipment module 318 may be configured to define a particular location for each device to be controlled. In other embodiments, the number of sensors, devices to be controlled and UEs may also be associated with a building 424. In such embodiments, the equipment module 318 may be configured to define a building location as a location valid for all devices to be controlled. The Device Manager may also comprise a device controller 314 configured to define policy rules to control the devices and/or the sensors within the building. The Device Manager may also comprise a first receiver configured to receive first inputs from one or more sensors. The Device Manager may also comprise a second receiver configured to receive second inputs from an entity of the telecommunication network in respect of one or more UEs 426a-c. These first and second receivers may be separate units or may be implemented as the receiver 304. The Device Manager may also comprise a regulator (not illustrated in any drawing) configured to process the first and second inputs to determine one or more regular home policy rules to be applied for controlling the one or more devices 403a-c, namely home appliances, and/or one or more sensors 402a-d at home. The Device Manager may also comprise an actuator (not illustrated in any drawing) configured to actuate in accordance with the determined one or more regular home policy rules for controlling the one or more home appliances and/or the one or more home sensors. The entity of the telecommunication network may be at least one of a PCRF entity and an MME. The regulator of the Device Manager may further be configured to determine one or more new home policy rules that overwrite the previously applicable regular home policy rules, and the actuator may further be configured to actuate in accordance with the determined one or more new home policy rules for controlling the one or more home appliances, i.e. the one or more devices 403a-c, and/or the one or more sensors 402a-d.

Exemplary methods and apparatus allow users to have accurate energy control (either for saving energy or for extending the period of comfort temperature) due to activity and location information pertaining to a set of associated mobile devices, i.e. UEs 426a-c. On-demand, automatic policy rules can be configured in the Device Manager for taking into account these new sources of information, namely UE activity data and UE location data. Exemplary systems allow some degree of control to the users, but most of the home control management is done automatically from the Device Manager without user's intervention. Therefore, a significant advantage of the invention is the ability to use UE activity data and UE location data of mobile devices that are linked to the building, or rather linked to the devices to be controlled in the building, as a source of information, and the consequent ability of the Device Manager to use this information to alter the existing policy rules, create new policy rules, or use existing alternative policy rules for building control. Exemplary methods and apparatus provide value for the user, due to the savings in energy, added flexibility and more accurate building control. Exemplary methods and apparatus provide value for the operator because the centralized building control can be offered together with other triple or quadruple play services, making effectively quintuple play services offer for the operator. In this respect, a triple play service is a marketing term for the provisioning, over a single broadband connection, of broadband Internet access and television, and the latency-sensitive telephone; and quadruple play or quad play is a marketing term combining the triple play service of broadband Internet access, television and telephony with wireless service provisions. Additionally, when exemplary methods and apparatus are offered from a single centralized network node for a plurality of subscribers, the capital expenditure (CAPEX) and operational expenditure (OPEX) associated with the service is much lower than the sum of the CAPEX and OPEX of each of the building energy and automation control should they be installed in each of the buildings. This will bring an economic benefit to the end user.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A device manager at a location for controlling one or more devices at the location, the device manager comprising:
a receiver configured to receive sensor data from one or more sensors at the location;
at least one processor operating as a device controller, the at least one processor configured to determine device control data for controlling operation of one or more devices at the location based on the received sensor data and one or more policy rules stored in a memory;
an equipment module configured to link the one or more devices under control, the one or more sensors, and one or more network identities that are associated with one or more user equipments (UEs) associated with the location;
a transmitter configured to transmit the device control data to the one or more devices;
an activity determiner configured to transmit, via the transmitter, a message to a network node to subscribe to receive User Equipment (UE) data associated with the one or more network identities that are associated with the one or more UEs, the message indicating one or more subscriber identities associated with the location;
wherein the receiver is further configured to receive, from the network node, the UE data relating to the one or more network identities that are associated with the one or more UEs associated with the location, and wherein the UE data comprises UE location data and UE activity data; and
a UE locator configured to determine a trajectory for at least one of the one or more UEs based on a plurality of successive UE location data for the at least one UE, and
wherein the at least one processor operating as the device controller is further configured to:
correlate the UE location data and the UE activity data with the one or more sensors at the location; and
based on the device control data and based on the determined trajectory, the UE activity data, and the UE location data correlated with the one or more sensors at the location, control at least one of the one or more devices to change at least one setting associated with the one or more devices at the location.

2. The device manager according to claim 1, wherein the device controller is configured to determine the device control data further based on the location of at least one of the one or more devices.

3. The device manager according to claim 1, wherein the UE locator is further configured to determine whether the at least one of the one or more UEs is located within a proximity of the location of the one or more devices, based on the received UE location data.

4. The device manager according to claim 3, wherein the device controller is configured to determine the device control data for at least one of the one or more devices when at least one of the one or more UEs is located in the proximity of the location of at least one of the one or more devices, and/or when at least one of the one or more UEs is not located within the proximity of the at least one of the one or more devices.

5. The device manager according to claim 1, wherein the device controller is configured to determine the device control data based on the received sensor data and the one or more policy rules stored in the memory when the determined trajectory indicates that the at least one UE is travelling towards a location of at least one of the one or more devices.

6. The device manager according to claim 3, wherein the UE locator is further configured to estimate a time of arrival of the at least one UE to a proximity of the location of at least one of the one or more devices, and wherein the device controller is configured to determine the device control data further based on the estimated time of arrival.

7. The device manager according to claim 1, wherein the device controller is configured to determine the device control data for controlling operation of one or more of:
   a heating system;
   an air conditioning system;
   automated window coverings;
   one or more home or garden appliances; and
   electric car charging.

8. The device manager according to claim 1, wherein the network node is at least one of:
   a Policy and Charging Rules Function (PCRFA) entity;
   a Mobility Management Entity (MME);
   a Traffic Detection Function (TDF) entity; and
   a Policy and Charging Enforcement Function (PCEF) entity.

9. The device manager according to claim 1, further comprising a sensor controller configured to transmit a request, via the transmitter, to the one or more sensors for further sensor data following receipt of the UE data, and wherein the device controller is configured to determine the device control data further based on the further sensor data.

10. The device manager according to claim 1, wherein the UE activity determiner is configured to determine whether the at least one of the one or more UEs is active based on the received UE activity data.

11. The device manager according to claim 10, wherein the device controller is configured to determine the device control data for at least one of the one or more devices when the at least one UE is active and the at least one UE is located within a proximity of the at least one of the one or more devices, and/or when at least one of the one or more UEs is not active and the at least one UE is located within the proximity of the at least one of the one or more devices.

12. The device manager according to claim 1, wherein the UE location data includes a cell identity of a cell currently serving the UE.

13. The device manager according to claim 1, wherein the UE activity data indicates a type of activity which allows the device manager to determine whether there is a human intervention behind the activity, and wherein the device controller is configured to determine the device control data further based on the received UE data and the determination of the human intervention.

14. A method by a device manager at a location, the method for controlling one or more devices at the location, the method comprising:
   receiving, at a receiver of the device manager, sensor data from one or more sensors at the location;
   transmitting, via a transmitter, a message to a network node to subscribe to receive User Equipment (UE) data associated with one or more network identities that are associated with one or more UEs, the message indicating one or more subscriber identities associated with the location;
   receiving, by the receiver from the network node, the UE data relating to the one or more network identities that are associated with the one or more UEs associated with the location, wherein the UE data comprises UE location data and UE activity data;
   linking, by an equipment module of the device manager, the one or more devices, the one or more sensors, and the one or more network identities that are associated with the one or more UEs associated with the location;
   correlating the UE location data and the UE activity data with the one or more sensors at the location;
   determining, by a UE locator, a trajectory for at least one of the one or more UEs based on a plurality of successive UE location data for the at least one UE;
   based on the received sensor data, one or more policy rules stored in a memory, the determined trajectory, the UE activity data and the UE location data correlated with the one or more sensors at the location, determining, by at least one processor operating as a device controller of the device manager at the location, device control data for changing at least one setting associated with the one or more devices at the location; and
   transmitting, by a transmitter, the device control data to the one or more devices at the location to change the at least one setting associated with the one or more devices at the location.

15. The method according to claim 14, wherein the device control data is determined further based on the location of at least one of the one or more devices.

16. The method according to claim 14, further comprising determining, by the UE locator, whether the at least one of the one or more UEs is located within a proximity of the location of the one or more devices, based on the received UE location data.

17. The method according to claim 16, further comprising determining, by the device controller, the device control data for at least one of the one or more devices when at least one of the one or more UEs is located in the proximity of the location of at least one of the one or more devices, and/or when at least one of the one or more UEs is not located within the proximity of the at least one of the one or more devices.

18. The method according to claim 14, wherein, the method comprises determining, by the device controller, the device control data based on the received sensor data and the one or more policy rules when the determined trajectory indicates that the at least one UE is travelling towards the location of at least one of the one or more devices.

19. The method according to claim 16, further comprising estimating, by the UE locator, a time of arrival of the at least one UE to a proximity of the location of at least one of the one or more devices, and determining, by the device controller, the device control data further based on the estimated time of arrival.

20. The method according to claim 14, further comprising determining, by the device controller, the device control data for controlling operation of one or more of:
   a heating system;
   an air conditioning system;
   automated window coverings;
   one or more home or garden appliances; and
   electric car charging.

21. The method according to claim 14, wherein the network node is at least one of:
   a Policy and Charging Rules Function (PCRFA) entity;
   a Mobility Management Entity (MME);
   a Traffic Detection Function (TDF) entity; and
   a Policy and Charging Enforcement Function (PCEF) entity.

22. The method according to claim 14, further comprising transmitting, by a sensor controller via the transmitter, a request to the one or more sensors for further sensor data following receipt of the UE data, and determining, by the device controller, the device control data further based on the further sensor data.

23. The method according to claim 14, further comprising determining, by the UE activity determiner, whether the at least one of the one or more UEs is active based on the received UE activity data.

24. The method according to claim 23, further comprising determining the device control data, by the device controller, for at least one of the one or more devices when the at least one UE is active and the at least one UE is located within a proximity of the at least one of the one or more devices, and/or when the at least one of the one or more UEs is not active and the at least one UE is located within the proximity of the at least one of the one or more devices.

25. A computer program stored in a non-transitory computer-readable medium that, when executed on at least one processor, causes the at least one processor to carry out the method according to claim 14.

26. A carrier containing the computer program of claim 25, wherein the carrier is a non-transitory computer readable storage medium.

27. The method according to claim 14, wherein the UE location data includes a cell identity of a cell currently serving the UE.

28. The method according to claim 14, further comprising:
  predicting, by a device manager, a future trajectory of the at least one of the one or more UEs based on the determined trajectory; and
  determining, by the device manager, that the at least one of the one or more UEs is located in a proximity of the one or more devices.

* * * * *